May 23, 1950     G. B. LOPER     2,508,677
ATTENUATION CONTROL CIRCUIT
Filed March 20, 1946     2 Sheets-Sheet 1

INVENTOR.
GEORGE B. LOPER
BY
Sidney A. Johnson
ATTORNEY

INVENTOR.
GEORGE B. LOPER
BY
Sidney A. Johnson
ATTORNEY

Patented May 23, 1950

2,508,677

UNITED STATES PATENT OFFICE 2,508,677

ATTENUATION CONTROL CIRCUIT

George B. Loper, Dallas, Tex., assignor, by mesne assignments, to Socony-Vacuum Oil Company, Incorporated, New York, N. Y., a corporation of New York Application March 20, 1946, Serial No. 655,662

5 Claims. (Cl. 179—171)

The present invention relates to an attenuation control circuit for amplifiers, and more particularly to an attenuation control circuit for use with electric seismographs.

In seismic prospecting systems customarily a charge of explosive is detonated in a shothole to produce seismic waves which are reflected from the sub-surface horizons and interfaces. The travel of these waves through the underground strata attenuates the waves so that the waves reflected from the deeper interfaces are attenuated to a greater degree. The different densities in sub-surface strata also play a part in determining the attenuation caused by the distance traveled.

The reflected waves are picked up at a plurality of points remote from the shothole by a suitable arrangement of detectors or geophones generally referred to as a spread. The reflected waves reach the different geophones at different times and different interfaces cause different series of reflections to reach the geophones so that a recording of the reception of such waves on a seismic oscillograph will provide the necessary data from which computations may be made to plot the contour of the different strata reflecting the waves.

The time of arrival at each geophone of the first wave is ascertained by the beginning of the movement of the oscillograph element from its neutral position, and in order to increase the accuracy of the determination of the initial movement of the oscillographic element, it has been customary to have the amplifier set at maximum gain. With the amplifier set at high or maximum gain, the initial movement of the galvanometer or oscillographic element produces a sharp break in the seismogram thereby minimizing any necessity to estimate the precise instance at which the oscillographic elements start to move.

Subsequent to the arrival of the initial direct wave a series of reflected waves are received which over a period of time are progressively attenuated. Since the first or initial reflected waves are of higher amplitude than succeeding reflected waves, it has been customary to reduce the gain of the amplifier, and thereafter to increase the gain of the amplifier as a function of time. It has been found, however, that certain systems providing for an arbitrary increase in the gain of the amplifier as a function of time introduce a modulation or distortion of the received waves. It, therefore, would be desirable to provide a gain control for the amplifier or an attenuation control which would provide a wide variation of control of the amplitude of the signal to be recorded with no unwanted signal introduced by such control.

In accordance with the present invention an electronic attenuation control is provided to operate with an amplifier which is capable of handling relatively large signal amplitudes without distortion and which is of a relatively simple circuit design requiring the minimum number of circuit elements. This is accomplished by the use of a bridge network which is capable of controlling the signal amplitude from a limiting value of zero to the maximum without modulation or distortion of the signal. It is, therefore, an object of the present invention to provide an improved attenuation control circuit for controlling the amplitude of transmitted signals.

It is a further object of the present invention to provide an improved signal transmission circuit for controlling the amplitude of signals in a seismographic recording system.

Other and further objects and advantages of the present invention will become apparent from the following description taken in conjunction with the accompanying drawings, in which.

Figures 1, 2:
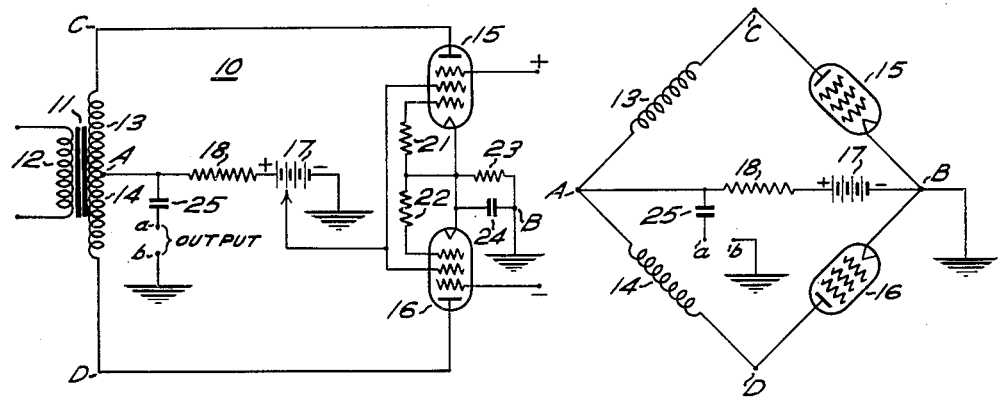
Fig. 1 is a circuit diagram of a signal control or attenuation circuit constructed in accordance with the present invention.
Fig. 2 is an equivalent circuit explanatory of the operation of the circuit shown in Fig. 1.

A signal attenuation or control circuit is shown in Fig. 1 as having a transformer 11 provided with a primary input winding 12 which is connected to a suitable source of signals to be transmitted. This source of signals may be a geophone or a stage of amplification. The transformer 11 is provided with a secondary winding formed in two portions 13 and 14 to form two arms of a bridge network having as the remaining arms two vacuum tubes 15 and 16. These vacuum tubes have their anodes connected to the outer terminals of the windings 13 and 14. The vacuum tubes 15 and 16 are shown as being of the pentode type. A source of anode potential 17 is connected between ground and a resistor 18 which in turn is connected to the midpoint of the secondary winding of the transformer 11. From an intermediate point on the source of potential 17, potential is supplied to the screen grids of the vacuum tubes 15 and 16. The control grids are provided with grid resistors 21 and 22 which are connected to the cathodes of the vacuum tubes. The cathodes of the vacuum tubes are self-biased by a resistor 23 connected to ground and by-passed by a capacitor 24. The suppressor grids are arranged to be connected to a source of control potential so that for example, one of the vacuum tubes, such as the tube 15, has its suppressor grid connected to a positive source of potential whereas the vacuum tube 16 has its suppressor grid connected to a negative source of potential.

If the suppressor grids of the vacuum tubes 15 and 16 are at equal potentials, the vacuum tubes constitute similar balancing arms of the bridge network so that no signal current flows between the points AB which is one diagonal of the bridge. An output capacitor 25 is connected to an output terminal a, the other output terminal b being connected to ground. The capacitor 25 serves to isolate the direct current circuit for the screen grids and anodes of the vacuum tubes from the output circuit. If either of the vacuum tubes 15 or 16 has its suppressor grid potential varied, the bridge network will become unbalanced so that alternating current potential supplied to the primary winding of the transformer 11 will appear in the diagonal AB and across the output terminals connected between ground and the capacitor 25. This diagonal AB includes the battery or source of supply 17 for the anodes of tubes 15 and 16 and an impedance or resistor 18 in which the sum of the anode currents flows.

Fig. 2 illustrates more clearly the bridge network relation of the circuit shown in Fig. 1. From this it is quite apparent that the vacuum tubes 15 and 16 comprise adjacent arms of the bridge. The transformer windings 13 and 14, having like impedances, comprise the other adjacent arms of the bridge. In effect, the transformer 11 by means of the windings 13 and 14, supplies alternating current across one diagonal of the bridge indicated by the points CD. When the bridge network is balanced, there is no alternating current potential across the diagonal AB which includes the impedance or resistor 18. If the tube 15 has its electrode potentials changed so that its dynamic plate resistance differs for the time being from the dynamic plate resistance of the vacuum tube 16, an alternating current potential will appear across the diagonal AB. If now the electrode potentials on the vacuum tube 16 are varied in an opposite sense relative to the vacuum tube 15, the unbalance of the bridge becomes greater so that a greater output potential appears across the diagonal AB. The suppressor grids of the vacuum tubes 15 and 16 are supplied with potentials so as to unbalance these arms of the bridge network in opposite senses and by the desired amount.

The anode current from one side of the source 17 flows through the impedance or resistor 18 and divides through the arms or windings 13 and 14 of the bridge and thence through the tubes 15 and 16 to the other side of source 17. For balanced operating conditions the currents flowing through the tubes 15 and 16 will be of equal magnitude. In accordance with the invention, by simultaneously changing in opposite directions and by like amounts the impedances or resistances of the two arms comprising the tubes 15 and 16, the current through one tube will increase by the same amount the current through the other tube will decrease. The sum of the currents which flows through the resistor 18 remains constant. Therefore, the direct current potential difference across the resistor 18 remains constant, and there is not introduced a voltage or potential difference in the output circuit due to operation of the gain-controlling means. The change in the balance of the bridge does not introduce a signal into the output circuit. The result is pure amplitude control of the input signals.

If the network is initially unbalanced so that alternating current potentials will appear across the diagonal AB, the magnitude or amplitude of the alternating current potential may be reduced or attenuated by reducing the unbalanced condition of the vacuum tubes 15 and 16. This is accomplished by reducing in equal amounts relative to the cathodes the positive and negative potentials applied to the suppressor grids. It, therefore, is apparent that in response to a control voltage the bridge network may be arranged to operate in any desired manner to reduce the alternating current output. On the other hand, if the bridge network is initially set so that the arms 15 and 16 are balanced or at a condition very nearly balanced, the alternating current output across the diagonal AB will be zero or at a relatively low value. If thereafter control potentials are applied to the vacuum tubes 15 and 16 in opposite senses there will be obtained an increase in the alternating current output across the diagonal AB, and hence the circuit may operate as a signal expander instead of a signal compressor or contractor. In either case, there will be avoided introduction of signals due to the bias applied to the tubes 15 and 16.

In describing Fig. 1 it was stated that the input winding of the transformer 11 is connected to a suitable source of signals which may constitute a geophone or a stage of amplification. Where the transformer 11 is connected to a stage of amplification, the output terminals are connected to succeeding stages of amplification, thereby to control the amplitude of the output of the amplifier.

Figure 3:
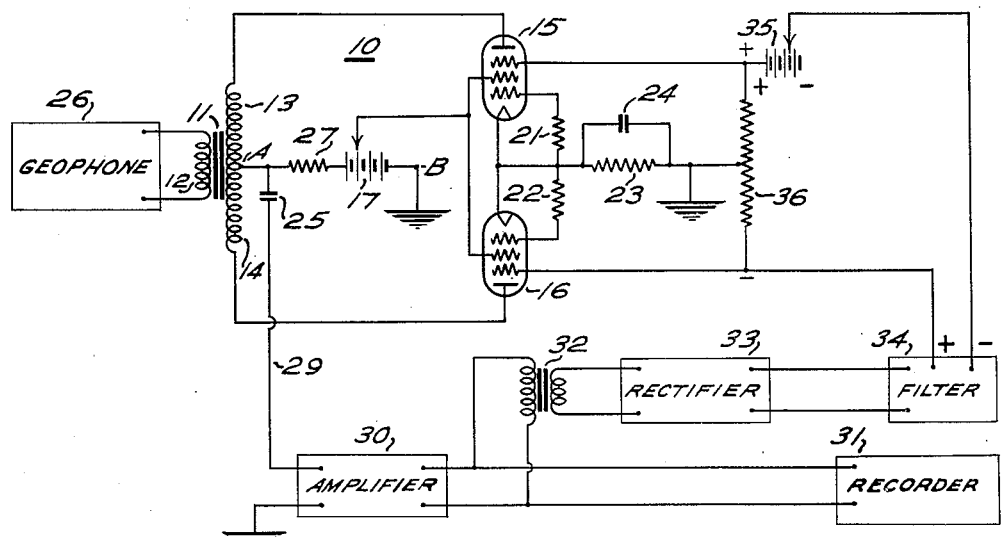
Fig. 3 shows the application of the present invention to a seismographic recording system.

It is to be understood that the bridge network circuit heretofore described is particularly useful in seismographic recording systems such as shown in Fig. 3 wherein the elements of the bridge network corresponding to similar elements shown in Fig. 1 have been given corresponding reference characters. A geophone 26 is connected to the transformer winding 12 of the transformer 11. The secondary windings 13 and 14 of the transformer 11 are connected to the anodes of vacuum tubes 15 and 16 which are self-biased and are provided with grid resistors 21 and 22 in the same manner as the circuit shown in Fig. 1. The midpoint of the secondary winding of the transformer 11 is connected through a resistor 27 to the positive terminal of the source of anode potential 17. The output circuit, including a coupling or blocking capacitor 25, the conductor 29 and the connection to ground, is connected to an amplifier 30, the output of which energizes the seismograph recorder 31. A portion of the output voltage of the amplifier 30 is applied by way of a transformer 32 to a rectifier 33 which changes the signal voltage into a direct current voltage proportional to the amplitude of the output of the amplifier 30. This direct current voltage produced by a rectifier 33 is passed through a filter 34 which thus supplies variable direct current voltage to the suppressor grids of the vacuum tubes 15 and 16. The vacuum tubes 15 and 16 are initially unbalanced in opposite senses by a biasing potential 35 which produces a voltage drop across a center-tapped resistor 36. The midpoint or center-tap of the resistor 36 is connected to ground, and the outer extremities of the resistor are connected to the suppressor grids of the vacuum tubes 15 and 16. The variable source of direct current potential produced by the rectifier 33 and passed through the filter 34 is connected in opposition to the voltage appearing across the resistor 36.

It may be assumed that initially the vacuum tubes 15 and 16 are so biased, by the source of potential 35 which produces the biasing voltage drop across the resistor 36, that a maximum transmission of alternating current signal energy is provided by the bridge network. The initial wave received by the geophone and thereby converted into a signal voltage applied to the amplifier 30 will be of high signal amplitude. After amplification it is applied to the recorder 31. A portion of the high signal amplitude output from the amplifier 30 is passed through the rectifier 33 which produces a direct current potential relatively large so as to reduce to a considerable degree the potential appearing across the resistor 36, thus bringing the vacuum tubes 15 and 16 more nearly toward balanced operating conditions. More specifically, the initial positive bias on the suppressor grid of tube 15 and the negative bias on the suppressor grid of tube 16, both with respect to ground or their respective cathodes, are respectively reduced. The result is that the dynamic plate resistance of the respective tubes 15 and 16 approach each other in value and as the impedances of the arms constituting the vacuum tubes 15 and 16 approach each other in value, the amount of alternating current passed by the bridge network is sharply reduced. Thus, the initial high amplitude reflected seismic waves received by the amplifier 30 will be properly recorded on the seismogram by the recorder 31. The rectifier 33, however, for subsequent signals of less amplitude, will receive less energy in accordance with the corresponding reduced signal amplitude of the output of the amplifier 30 so that the opposing potential supplied by the rectifier 33 will be less than under the conditions obtained immediately after the reception of the initial direct wave. As successive waves received by the geophone are of decreased amplitude, the rectifier 33 supplies bias voltages of reduced amplitude so that the recorder 33 receives an energy level for the different successive waves which is very nearly constant. This condition is obtained by proportioning the various circuit elements shown in Fig. 3 to meet the design requirements and in accord with well understood principles.

Since pure amplitude control is provided by making the amplitude dependent upon the unbalance of the bridge and independent of the control bias and of the division in the direct current between the tubes 15 and 16, the applied signals from the geophone 26 are recorded by the recorder 32 without obscurement by extraneous amplitude-control voltages.

Figure 4:
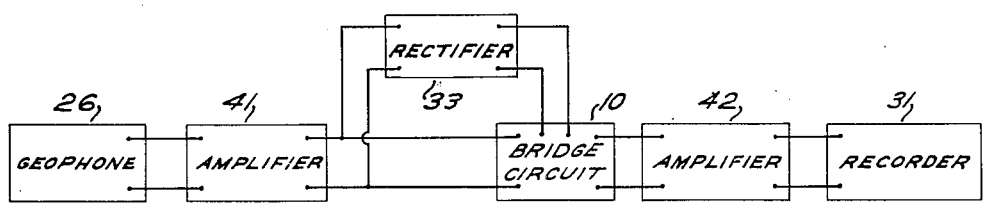
Fig. 4 is a block diagram showing another application of the invention to a seismographic recording system.

While a particular form of operation has been mentioned in conjunction with the showing of Fig. 3 to illustrate one mode of utilizing the bridge network of Fig. 1, it, of course, will be apparent to those skilled in the art that different applications and different modes of operation may be obtained. It was previously mentioned that the bridge network might be interposed between successive stages of amplification so that, for example, the rectifier 33 might be connected ahead of the amplifier 30 so as to maintain the output of the amplifier substantially constant so as to operate in a manner similar to the substantially constant output of an amplifier provided with an automatic gain control. This is diagrammatically illustrated by the block diagram in Fig. 4 showing a geophone 26 connected to an amplifier 41 which is connected to the bridge circuit 10. A portion of the output of the amplifier 41 is supplied to the rectifier 33 which controls the bridge network 10 so that the amount of energy supplied to the succeeding stage of amplification 42 causes the amplifier to have an output characteristic which is subsequently constant, thereby supplying substantially constant signal amplitudes to the recorder 31.

It will be remembered that in Fig. 3 a transformer 32 is interposed between the amplifier 30 and the rectifier 33. The transformer is necessary to isolate the rectifier and the filter from the grounded side of the amplifier. In some cases, it may be desired to omit the transformer 32. This may be accomplished by combining in the present system an arrangement disclosed in my co-pending application, Serial No. 585,095, filed March 27, 1945, for "Gain control system for seismographs."

Figure 5:
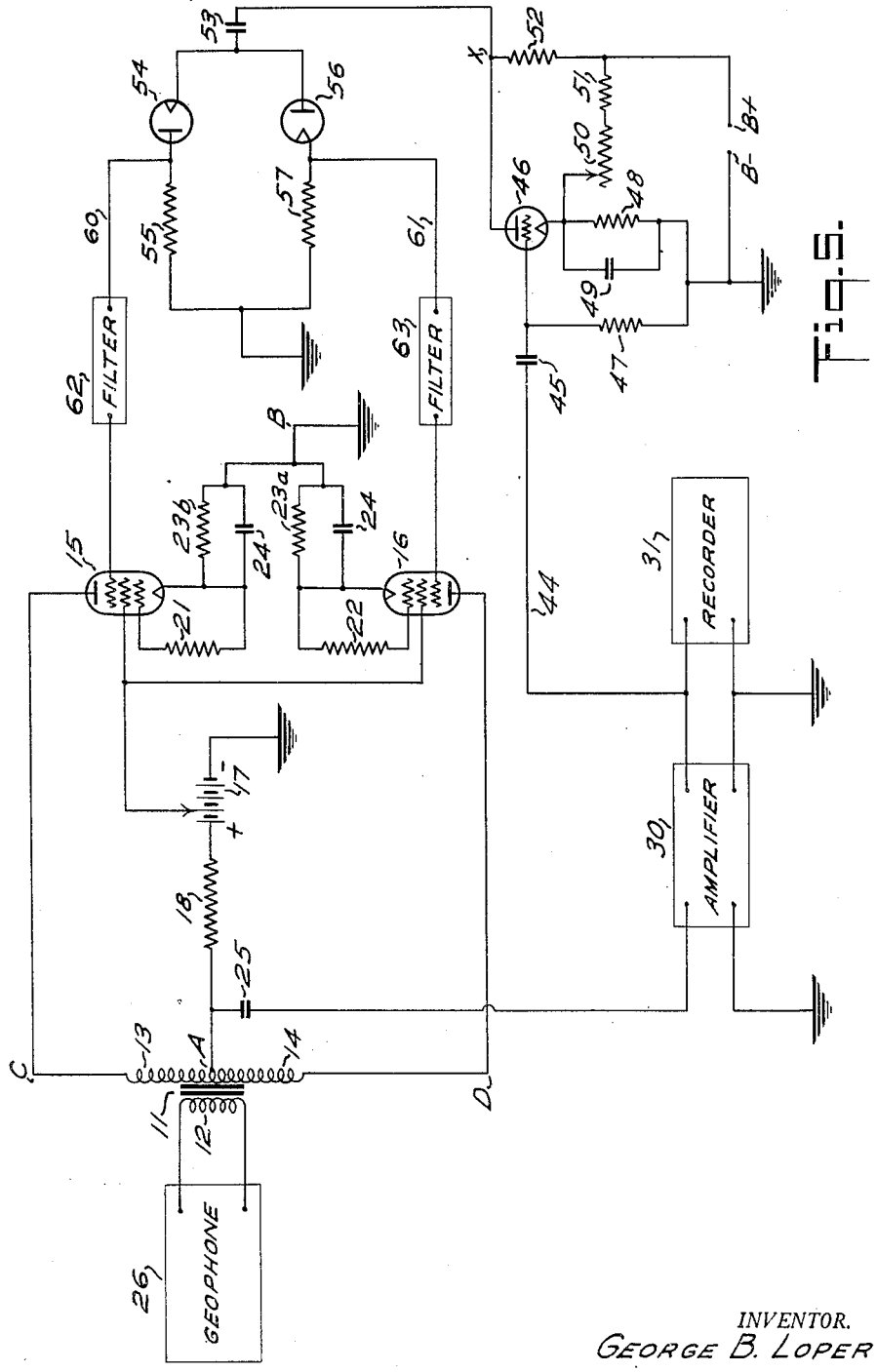
Fig. 5 is a wiring diagram of another application of the invention to a seismographic recording system.

Such a system is illustrated in Fig. 5 wherein seismic signals derived from the output of the amplifier 20 are applied by way of a conductor 44 and a capacitor 45 to an input circuit of a tube 46 provided with a grid resistor 47 and a cathode grid-biasing means comprising a cathode resistor 48 and a bypass capacitor 49. The grid of the tube 46 is at all times negatively biased beyond plate current cutoff by means of a variable resistor circuit including resistors 50 and 51. Included in the anode supply circuit is a resistor 52 of relatively high value, for example, of the order of 500,000 ohms. This imparts poor voltage-regulation characteristics to the anode supply circuit of the tube 46. In other words, when applied signals of predetermined amplitude render the valve 46 conductive, the resulting flow of unidirectional current through the resistor 52 produces a large IR drop so that at the point X, the circuit or anode potential drops to very low value, approaching zero as a limit.

The output from the tube 46 is applied by a capacitor 53 to a control network which includes two parallel circuits, one including a diode 54 and a resistor 55, while the other branch includes a diode 56 and a resistor 57. The diode 56 and the resistor 57 provide a charging circuit for the capacitor 53, while the diode 54 and the resistor 55 provide a discharge circuit therefor.

In accordance with this arrangement the direction of current flow through the resistor 55 is sufficient to make negative the end thereof remote from the ground connection, while the end of resistor 57 remote from the ground connection is made positive. Accordingly, a conductor 60 applies a negative bias to the suppressor grid of the tube 15, while a conductor 61 applies a positive bias to the suppressor grid of the tube 16. The control potentials may be filtered, if desired, as by the filters 62 and 63.

Further, in accordance with the modification of Fig. 5, the cathode resistor 23a is larger than the cathode resistor 23b so that the tube 16 has applied to the control grid thereof a larger negative bias than is applied to the control grid of the tube 15. Accordingly, the bridge including the tubes 15 and 16 is unbalanced. However, the voltages derived from the resistors 55 and 57 are applied to the suppressor grids of the tubes 15 and 16 with polarities such as to change the dynamic resistance values of the tubes 15 and 16 in directions to make them more nearly equal to each other. This change occurs as a function of the amplitude of the signals derived by way of the capacitor 45 and, as the magnitude of the derived signals increases, the tubes 15 and 16 adjust the bridge towards a balanced position to maintain the amplitude of the signals substantially constant.

As before, there is avoided introduction into the amplifier 30 and the recorder 32 any signal due to a voltage from the gain-controlling means. The modification of Fig. 5 has the advantage that the control voltages applied by way of the resistors 60 and 61 have one side of resistors 55 and 57 at ground potential, which makes for greatest simplicity in construction and avoids the use of a transformer and an unbalancing battery such as the battery 35 of Fig. 3.

While for the purpose of illustrating and describing the present invention, a preferred circuit arrangement has been shown, and certain specific applications have been illustrated, it is to be understood that the invention is not to be limited thereby since such variations in the circuit arrangement and in the mode of operation are contemplated as may be commensurate with the spirit and scope of the invention set forth in the following claims.

What is claimed is:

1. The combination, with an amplifier and a source of variable signals, comprising a bridge circuit having a first diagonal energized by said signals and a second diagonal for transferring said signals to said amplifier, said bridge circuit having in each of two adjacent arms a vacuum tube, the anodes of said vacuum tubes being connected to the opposite points of said first diagonal of said bridge, a source of anode supply and an impedance series-connected across said second diagonal of the bridge for flow of anode current through the four arms of the bridge, means responsive to the output of said amplifier for inversely varying the conductivities of said tubes to increase the anode current in one tube while decreasing the anode current in the other tube, the sum of the currents flowing through said impedance remaining constant.

2. Means providing for pure amplitude control of signals comprising a bridge circuit, means developing input signals across a first diagonal of said bridge, a vacuum tube in each of two adjacent arms of said bridge with the cathodes thereof connected together at one end of a second diagonal of the bridge and each anode thereof respectively connected to an end of said first diagonal of said bridge, a source of anode supply and an impedance series-connected across said second diagonal of said bridge for flow of anode current through said resistor and through all four arms of said bridge, means differently biasing said tubes to unbalance the bridge by the resultant differing dynamic resistances of said tubes for minimizing reduction in amplitude of output signals developed across said second diagonal by attenuation of said input signals and means for changing the bias on said tubes in opposite directions to vary the amplitude of the output signals, the sum of the resultant direct currents flowing through the tubes remaining the same, thereby to balance out in said impedance the effects of the variations in said direct current due to said amplitude control.

3. For use in a seismic prospecting system having means for detecting seismic waves, a recorder for recording said waves, and an amplifier connected between said recorder and said detecting means, of means associated with said amplifier for producing a compensation for the attenuation of progressively received seismic waves including a signal transmission bridge circuit having an input connected across a first diagonal and an output derived from a second diagonal, said bridge circuit having in each of two adjacent arms a vacuum tube, the anodes of said vacuum tubes being connected to the opposite points of said first diagonal of said bridge, a source of anode supply and a resistor series-connected across said second diagonal of the bridge for flow of anode current through the four arms of the bridge, means responsive to the output of said amplifier for inversely varying the conductivities of said tubes to increase the anode current in one tube while decreasing the anode current in the other tube, the sum of the currents flowing through said resistor remaining constant.

4. For use in a seismic prospecting system having means for detecting seismic waves, a recorder for recording said waves, and an amplifier connected between said recorder and said detecting means, of means associated with said amplifier for producing a compensation for the attenuation of progressively received seismic waves including a signal transmission bridge circuit having an input connected across a first diagonal and an output derived from a second diagonal, a vacuum tube in each of two adjacent arms of said bridge with the cathodes thereof connected together at one end of a second diagonal of the bridge and each anode thereof respectively connected to an end of said first diagonal of said bridge, a source of anode supply and a resistor series-connected across said second diagonal of said bridge for flow of anode current through said resistor and through all four arms of said bridge, means differently biasing said tubes to unbalance the bridge by the resultant differing dynamic resistances of said tubes for minimizing reduction in amplitude of output signals developed across said second diagonal by attenuation of said input signals and means for changing the bias on said tubes in opposite directions to vary the amplitude of the output signals, the sum of the resultant direct currents flowing through the tubes remaining the same, thereby to balance out in said resistor the effects of the variations in said direct current due to said amplitude control.

5. In a signal amplifying channel which has associated therewith a source of variable signals and an output circuit, a bridge network interposed between said source of signals and said output circuit and comprising two vacuum tubes having a common cathode connection and forming adjacent arms of said bridge, the anodes of said vacuum tubes being connected respectively to opposite ends of a first diagonal of said bridge and to said source of signals, an output impedance and a source of anode potential connected across the second diagonal of said bridge and to said output circuit, the anode currents of said vacuum tubes being equal when said bridge is balanced, a control circuit operable in accordance with signal amplitude of said output circuit for varying the conductivity of said vacuum tubes oppositely and by equal amount to maintain substantially constant the bridge output while maintaining constant the sum of said anode currents flowing through said output impedance.

GEORGE B. LOPER.

REFERENCES CITED

The following references are of record in the file of this patent:

UNITED STATES PATENTS

| Number | Name | Date |
|---|---|---|
| 2,182,100 | Tahon | Dec. 5, 1939 |
| 2,303,357 | Hoover | Dec. 1, 1942 |
| 2,303,358 | Hoover | Dec. 1, 1942 |
| 2,307,790 | Hoover | Jan. 12, 1943 |
| 2,310,342 | Artzt | Feb. 9, 1943 |
| 2,363,985 | Moser | Nov. 28, 1944 |
| 2,372,243 | Wulfsberg | Mar. 27, 1945 |
| 2,425,641 | Remde | Aug. 12, 1947 |